(12) United States Patent
Fan et al.

(10) Patent No.: US 11,043,068 B2
(45) Date of Patent: Jun. 22, 2021

(54) INTERACTIVE APPLICATION PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Yong Fan, Shenzhen (CN); Zhiqiang He, Shenzhen (CN); Jing Zhou, Shenzhen (CN); Wuming Yin, Shenzhen (CN); Caiming Fu, Shenzhen (CN); Xuan Yu, Shenzhen (CN); Mingang Huang, Shenzhen (CN); Yi Liu, Shenzhen (CN); Xiaohui Chen, Shenzhen (CN); Xiaohui Zheng, Shenzhen (CN); Ran Ding, Shenzhen (CN); Xiejuan Liao, Shenzhen (CN); Kan Liao, Shenzhen (CN); Yancen Lin, Shenzhen (CN); Xiongfei Wu, Shenzhen (CN); Ming Han, Shenzhen (CN); Yuan Yuan, Shenzhen (CN); Xin Zhang, Shenzhen (CN); Qingxin Chen, Shenzhen (CN); Sheng Huang, Shenzhen (CN); Yihua Jin, Shenzhen (CN); Yu Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 178 days.

(21) Appl. No.: 16/293,115

(22) Filed: Mar. 5, 2019

(65) Prior Publication Data
US 2019/0197826 A1 Jun. 27, 2019

Related U.S. Application Data

(63) Continuation of application No. PCT/CN2017/092675, filed on Jul. 12, 2017.

(30) Foreign Application Priority Data

Oct. 26, 2016 (CN) .......................... 201610949745.1

(51) Int. Cl.
*G07F 17/32* (2006.01)
*G06K 19/06* (2006.01)
(Continued)

(52) U.S. Cl.
CPC .......... *G07F 17/3237* (2013.01); *G06F 21/36* (2013.01); *G06K 19/06037* (2013.01);
(Continued)

(58) Field of Classification Search
CPC ............ G07F 17/3237; G07F 17/3209; G07F 17/323; G06Q 20/12; G06Q 30/0207; G06Q 30/0209
See application file for complete search history.

(56) References Cited

U.S. PATENT DOCUMENTS

| 6,227,972 B1 * | 5/2001 | Walker | ................. G06Q 20/204 235/380 |
| 6,558,255 B2 * | 5/2003 | Walker | ................. G06Q 20/204 463/20 |

(Continued)

FOREIGN PATENT DOCUMENTS

| CN | 101261703 A | 9/2008 |
| CN | 103111061 A | 5/2013 |
| CN | 106570388 A | 4/2017 |

OTHER PUBLICATIONS

International Search Report for corresponding PCT/CN2017/092675, dated Sep. 27, 2017.
(Continued)

*Primary Examiner* — Omkar A Deodhar
*Assistant Examiner* — Matthew D Hoel
(74) *Attorney, Agent, or Firm* — Oblon, McClelland, Maier & Neustadt, L.L.P.

(57) ABSTRACT

An interactive application processing method is described. A selection of an online interactive activity by a user is received in an interactive application. The online interactive activity is associated with an offline interactive activity. According to a past performance result, a determination is made, by circuitry of an interactive application apparatus, as to whether the user qualifies to participate in the offline interactive activity. When the user is determined to qualify to participate in the offline interactive activity, identity information of the user is acquired. A certificate is generated based on the identity information for allowing the user to participate in the offline interactive activity.

20 Claims, 7 Drawing Sheets

(51) Int. Cl.
    *H04L 29/08* (2006.01)
    *G06Q 20/12* (2012.01)
    *G06Q 30/02* (2012.01)
    *G06Q 30/06* (2012.01)
    *G06F 21/36* (2013.01)
    *G06F 3/0482* (2013.01)
    *G06Q 20/06* (2012.01)

(52) U.S. Cl.
    CPC ......... *G06Q 20/12* (2013.01); *G06Q 30/0207* (2013.01); *G06Q 30/0209* (2013.01); *G06Q 30/0601* (2013.01); *G07F 17/323* (2013.01); *G07F 17/3209* (2013.01); *H04L 67/22* (2013.01); *G06F 3/0482* (2013.01); *G06Q 20/06* (2013.01); *G07F 17/3293* (2013.01)

(56) References Cited

U.S. PATENT DOCUMENTS

| | | | | |
|---|---|---|---|---|
| 7,086,947 B2 * | 8/2006 | Walker | G06Q 30/0209 463/16 |
| 7,458,892 B2 * | 12/2008 | Walker | G06Q 30/0209 463/16 |
| 7,572,187 B2 * | 8/2009 | Van Luchene | A63F 13/12 463/42 |
| 7,651,395 B2 * | 1/2010 | Van Luchene | G07F 17/3255 463/29 |
| 7,666,095 B2 * | 2/2010 | Van Luchene | A63F 13/75 463/29 |
| 7,677,973 B2 * | 3/2010 | Van Luchene | G06Q 50/10 463/29 |
| 7,677,974 B2 * | 3/2010 | Van Luchene | A63F 13/58 463/29 |
| 7,677,975 B2 * | 3/2010 | Van Luchene | A63F 13/352 463/29 |
| 7,677,979 B2 * | 3/2010 | Van Luchene | A63F 13/352 463/42 |
| 7,686,691 B2 * | 3/2010 | Van Luchene | G07F 17/32 463/29 |
| 7,690,997 B2 * | 4/2010 | Van Luchene | A63F 13/12 463/42 |
| 7,717,782 B2 * | 5/2010 | Van Luchene | A63F 13/847 463/9 |
| 7,775,885 B2 * | 8/2010 | Van Luchene | G06N 3/006 463/42 |
| 7,780,532 B2 * | 8/2010 | Van Luchene | A63F 13/85 463/42 |
| 7,806,758 B2 * | 10/2010 | Van Luchene | A63F 13/12 463/1 |
| 7,862,426 B2 * | 1/2011 | Walker | G07F 17/3269 463/25 |
| 7,966,239 B2 * | 6/2011 | Van Luchene | A63F 13/75 705/35 |
| 7,974,901 B2 * | 7/2011 | Van Luchene | A63F 13/75 705/35 |
| 7,974,902 B2 * | 7/2011 | Van Luchene | A63F 13/75 705/35 |
| 8,070,599 B2 * | 12/2011 | Van Luchene | A63F 13/35 463/29 |
| 8,221,242 B2 * | 7/2012 | Van Luchene | A63F 13/80 463/42 |
| 8,221,243 B2 * | 7/2012 | Van Luchene | A63F 13/69 463/42 |
| 8,226,472 B2 * | 7/2012 | Van Luchene | A63F 13/87 463/25 |
| 8,251,810 B2 * | 8/2012 | Van Luchene | A63F 13/822 463/29 |
| 8,262,471 B2 * | 9/2012 | Van Luchene | G07F 17/3255 463/29 |
| 8,267,794 B2 * | 9/2012 | Van Luchene | G06Q 40/00 463/42 |
| 8,360,866 B2 * | 1/2013 | Van Luchene | A63F 13/85 463/25 |
| 8,360,867 B2 * | 1/2013 | Van Luchene | A63F 13/85 463/25 |
| 8,409,015 B2 * | 4/2013 | Van Luchene | G07F 17/32 463/42 |
| 8,454,431 B2 * | 6/2013 | Van Luchene | A63F 13/533 463/25 |
| 8,454,442 B2 * | 6/2013 | Van Luchene | G07F 17/3274 463/42 |
| 8,469,821 B2 * | 6/2013 | Van Luchene | G07F 17/3274 463/42 |
| 8,574,065 B2 * | 11/2013 | Van Luchene | G07F 17/3244 463/25 |
| 8,696,448 B2 * | 4/2014 | Van Luchene | G07F 17/32 463/29 |
| 8,734,229 B2 * | 5/2014 | Van Luchene | G06Q 30/02 463/25 |
| 8,751,343 B2 * | 6/2014 | Van Luchene | G06Q 30/00 705/35 |
| 8,751,344 B2 * | 6/2014 | Van Luchene | G06Q 20/10 705/35 |
| 8,777,755 B2 * | 7/2014 | Van Luchene | G07F 17/32 463/42 |
| 9,440,151 B2 * | 9/2016 | Van Luchene | A63F 13/79 |

OTHER PUBLICATIONS

2013 SSC QQ, http://tga.qq.com/act/ssc2013/rulel.shtml,http://tga.qq.com/act/ssc2013/reward-r3.shtml, Dec. 1, 2013 (Dec. 1, 2013), Sections of rules for the competition and competition rewards, (Tencent, "2013 SSC QQ Speed Super Cup").
Http://www.yiqipoker.com/news/asiastars/1443.html. Oct. 25, 2016 (Oct. 25, 2016), p. 1, non-official translation (The 2016 Boyaa Poker Tour Comes to a Successful End with Hong Kong's Ye, Lang Winning the Championship).
http ://wscs.163.com/news/2014/9/10/15437 462481.html, Sep. 10, 2014 (Sep. 10, 2014), pp. 1-2, (Netease, Inc., The WI Offline King Cup Tournament in Shanghai Station is for the fiery).
Written Opinion for corresponding PCT/CN2017/092675, dated Sep. 27, 2017 (English translation not provided).
First Chinese Office Action for corresponding CN201610949745.1, dated Nov. 30, 2017 (partial English translation provided).
Second Chinese Office Action for corresponding CN201610949745.1, dated May 28, 2018 (partial English translation provided).
Third Chinese Office Action for corresponding CN201610949745.1, dated Aug. 29, 2018 (partial English translation provided).
Fourth Chinese Office Action for corresponding CN20160949745.1, dated Dec. 14, 2018 (partial English translation provided).

* cited by examiner

INTERACTIVE APPLICATION PROCESSING METHOD AND APPARATUS, AND STORAGE MEDIUM

RELATED APPLICATION

This application is a continuation of International Application No. PCT/CN2017/092675, filed on Jul. 12, 2017, which claims priority to Chinese Patent Application No. 201610949745.1, entitled "INTERACTIVE APPLICATION PROCESSING METHOD AND APPARATUS" and filed on Oct. 26, 2016 in the Chinese Patent Office. The entire disclosures of the prior applications are hereby incorporated by reference in their entirety.

FIELD OF THE TECHNOLOGY

This application relates to the field of Internet.

BACKGROUND OF THE DISCLOSURE

With the rapid development of online interactive activities (such as online games), more and more games are performed online through terminal devices. However, online interactive activities and offline interactive activities have different experiences. Some users hope that online interactive activities may be performed offline, for example, through offline matches. Currently, offline matches require users to buy tickets to enter a stadium before the matches begin. Even if the content of the match is the same as the content of online interactive activities, the users cannot participate in offline interactive activities according to online interactive activity data because there is no information exchange between the online interactive activities and the offline interactive activities.

In view of the foregoing problems, no effective solution has yet been proposed currently.

SUMMARY

The embodiments of this application provide an interactive application processing method and apparatus, and a storage medium, and intend to at least solve the technical problem that an information interaction cannot be performed between related online and offline activities.

According to an aspect of the embodiments of this application, there is provided an interactive application processing method. In the method, a selection of an online interactive activity by a user is received in an interactive application. The online interactive activity is associated with an offline interactive activity. According to a past performance result, a determination is made, by circuitry of an interactive application apparatus, as to whether the user qualifies to participate in the offline interactive activity. When the user is determined to qualify to participate in the offline interactive activity, identity information of the user is acquired. A certificate is generated based on the identity information for allowing the user to participate in the offline interactive activity.

According to another aspect of the embodiments of this application, there is provided an interactive application processing apparatus. The interactive application processing apparatus includes circuitry. The circuitry receives a selection of an online interactive activity by a user in an interactive application. The online interactive activity is associated with an offline interactive activity. The circuitry determines, according to a past performance result, whether the user qualifies to participate in the offline interactive activity. When the circuitry determines that the user qualifies to participate in the offline interactive activity, the circuitry acquires identity information of the user. The circuitry generates a certificate based on the identity information for allowing the user to participate in the offline interactive activity.

According to another aspect of the embodiments of this application, there is provided a non-transitory computer-readable storage medium. The storage medium stores a program executable by a processor to perform the following. A selection of an online interactive activity by a user is received in an interactive application. The online interactive activity is associated with an offline interactive activity. According to a past performance result, a determination is made as to whether the user qualifies to participate in the offline interactive activity. When the user is determined to qualify to participate in the offline interactive activity, identity information of the user is acquired. A certificate is generated based on the identity information for allowing the user to participate in the offline interactive activity. In the embodiments of this application, a user qualifies to participate in an offline interactive activity by participating in an online interactive activity. If the user qualifies to participate in the offline interactive activity through an online interaction, identity information of the user is acquired to activate a qualification for participating in the offline interactive activity, so that the user participates in the offline interactive activity with the activated qualification. In this way, a relationship between an online interactive activity and an offline interactive activity is established, so that the online interactive activity and the offline interactive activity are no longer two independent activities, thereby solving the technical problem that an information interaction cannot be performed between related online and offline activities.

BRIEF DESCRIPTION OF THE DRAWINGS

The drawings described herein are used to provide a further understanding of this application, and constitute a part of this application. The exemplary embodiments of this application and descriptions thereof are used to explain this application and do not constitute improper limitations to this application. In the drawings.

DESCRIPTION OF EMBODIMENTS

To enable those skilled in the art to better understand the solution of this application, the following describes the technical solutions in the embodiments of this application with reference to the drawings in the embodiments of this application. The described embodiments are merely some but not all of the embodiments of this application. Based on the embodiments of this application, all other embodiments obtained by a person of ordinary skill in the art fall within the protection scope of this application.

It is noted that the terms "first," "second," etc. in the specification and claims of this application and in the foregoing drawings are used to distinguish similar objects and are not necessarily used to describe a specific sequence or precedence order. It will be appreciated that data used as such may be interchanged where appropriate so that the embodiments of this application described herein can be implemented in other than the order illustrated or described herein. In addition, the terms "include" and "have" and any variations thereof are intended to cover non-exclusive inclusions. For example, a process, method, system, product, or device containing a series of steps or units need not be limited to those steps or units that are explicitly listed, and may instead include other steps or units that are not explicitly listed or inherent to these processes, methods, products, or devices.

Embodiment 1

According to the embodiment of this application, a method embodiment which may be executed by an apparatus embodiment of this application is provided. It is noted that the steps shown in the flowchart of the drawings may be performed in a computer system such as a set of computer-executable instructions, and although a logical order is shown in the flowchart, in some cases, the illustrated or described steps may be performed in an order other than this.

According to the embodiment of this application, an interactive application processing method is provided.

Figure 1:
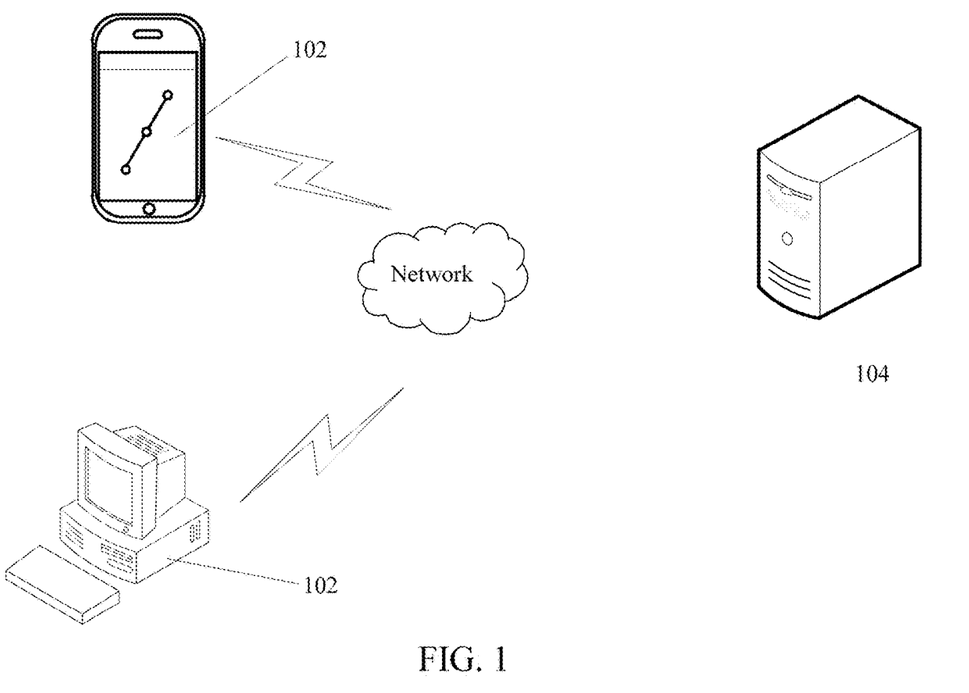
FIG. 1 is a schematic diagram of a hardware system according to an embodiment of this application.

In this embodiment, the foregoing interactive application processing method may be applied to a hardware environment composed of a terminal 102 and a server 104 as shown in FIG. 1. As shown in FIG. 1, the terminal 102 is connected to the server 104 through a network, which includes, but is not limited to, a mobile communication network, a wide area network, a metropolitan area network, or a local area network. The terminal 102 may be a mobile phone terminal, or may be a PC terminal, a notebook terminal, or a tablet computer terminal.

The main working principle of the hardware environment system shown in FIG. 1 is as follows.

A user performs an online interactive activity through the terminal 102, data of the online interactive activity being recorded in the server 104. The user may qualify to participate in an offline interactive activity through the online interactive activity, and after qualifying, identity information of the user is uploaded to the server 104 through the terminal 102, and the server 104 generates a certificate according to the identity information of the user. The user may participate in the offline interactive activity with the certificate. Here, virtual resources obtained by participating in the offline interactive activity may be returned to an account of the online interactive activity of the user according to the identity information recorded in the server 104. The user may view and use, through the terminal 102, the virtual resources obtained by participating in the offline interactive activity.

Figure 2:
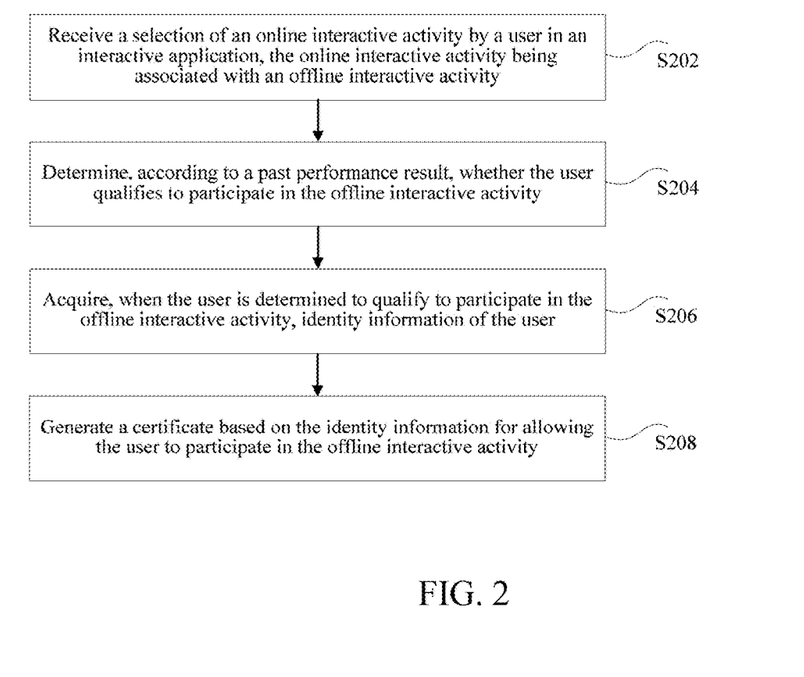
FIG. 2 is a flowchart of an interactive application processing method according to an embodiment of this application.

FIG. 2 is a flowchart of an interactive application processing method according to an embodiment of this application. As shown in FIG. 2, the interactive application processing method includes the following steps:

In Step S202, receive a selection of an online interactive activity by a user in an interactive application, the online interactive activity being associated with an offline interactive activity.

In Step S204, determine according to a past performance result, whether the user qualifies to participate in the offline interactive activity.

In Step S206, acquire, when the user is determined to qualify to participate in the offline interactive activity, identity information of the user.

In Step S208, generate a certificate based on the identity information for allowing the user to participate in the offline interactive activity.

In this embodiment, an association relationship between an online interactive activity and an offline interactive activity is established, so a user qualifies to participate in the offline interactive activity by participating in the online interactive activity. If the user qualifies to participate in the offline interactive activity through an online interaction, identity information of the user is acquired to activate a qualification for participating in the offline interactive activity, so that the user participates in the offline interactive activity with the activated qualification. In this way, a relationship between an online interactive activity and an offline interactive activity is established, so that the online interactive activity and the offline interactive activity are no longer two independent activities, thereby solving the technical problem that an information interaction cannot be performed between related online and offline activities.

Meanwhile, by means of this embodiment, a user may qualify to participate in an offline interactive activity based on the user's performance in an online interactive activity, thereby increasing the enthusiasm of the user participating in the online interactive activity. Compared with the way of purchasing a qualification for an offline interactive activity, the qualification obtained through an online interactive activity competition can better reflect the skills of a user, reduce the occurrence of uneven skills caused by directly purchasing the qualification, and make the offline interactive activity more interesting.

In an embodiment, after taking the identity information as a certificate for allowing the user to participate in the offline interactive activity, the method further includes: displaying, in the interactive application, virtual resources obtained by the user participating in the offline interactive activity with the identity information, the user participating in the online interactive activity by using the virtual resources in the interactive application.

The user may use the obtained qualification to participate in the offline interactive activity. By participating in the offline interactive activity, physical rewards or virtual resource rewards may be obtained, the virtual rewards may be returned into the interactive application, and the user uses the virtual resource rewards in the interactive application to participate in the online interactive activity.

By means of this embodiment, a user performs an online interactive activity to qualify to participate in an offline interactive activity, and then uses virtual resource rewards obtained by participating in the offline interactive activity to perform the online interactive activity. The online interactive activity and the offline interactive activity form a closed loop, thereby making the online interactive activity and the offline interactive activity more interesting, and increasing the enthusiasm and user experience of the user participating in the online interactive activity and the offline interactive activity. In other words, selection of a user to participate in an offline interactive activity through an online interactive activity reflects the skills of the user. For the interactive activities themselves, the interactive activities are more interesting because all the users participating in offline interactive activities are skilled players.

For example, the interactive application is a "Tencent Poker" APP, the online interactive activity is Texas Hold'em poker, and the offline interactive activity is a Texas Hold'em poker tournament.

Figure 3:
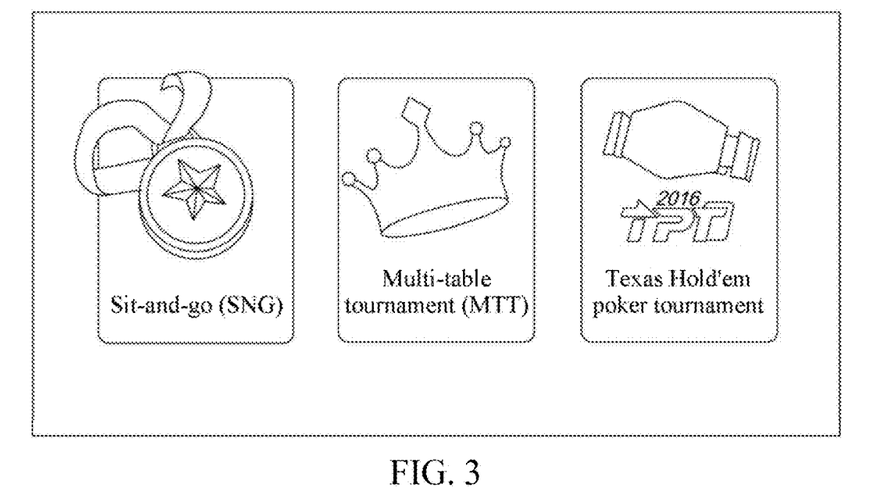
FIG. 3 is a schematic diagram of a match status of an interactive application according to an embodiment of this application.

A user may open the "Tencent Poker" APP to view a match status (as shown in FIG. 3) to determine whether there is an upcoming match. FIG. 3 shows a multi-table tournament (including sit-and-go (SNG) and MTT) and a Texas Hold'em poker tournament. In this example, the upcoming match is the Texas Hold'em poker tournament. A user may choose to participate in "trials" in the "Tencent Poker" APP, which are trials for the selection of a qualification for participating in the Texas Hold'em poker tournament. After passing the "trials," the user qualifies to participate in the Texas Hold'em poker tournament. The user may use the obtained qualification to participate in the Texas Hold'em poker tournament, and may view virtual resources obtained by participating in the Texas Hold'em poker tournament in the "Tencent Poker" APP. Moreover, the user may use these virtual resources to play other games in the "Tencent Poker" APP.

In an embodiment, acquiring a target online interactive activity selected by a user in an interactive application includes: determining a type of the user according to historical operation data of the user in the interactive application; showing an activity list to the user according to the type, online interactive activities in the activity list matching the type, so that the user may participate in the online interactive activities in the activity list; receiving a selection instruction sent by the user, the selection instruction being used for instructing to select a to-be-participated online interactive activity from the activity list; and taking the online interactive activity selected by the user as the target online interactive activity.

Figure 4:
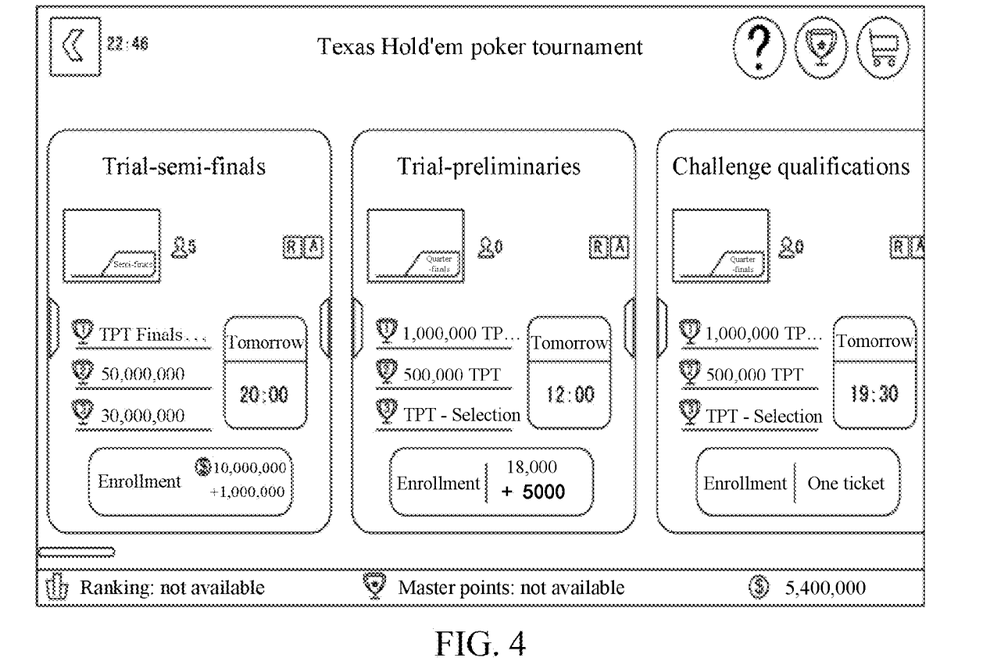
FIG. 4 is a schematic diagram of an online interactive activity of an interactive application according to an embodiment of this application.

The target online interactive activity may be an online interactive activity (such as the trials in the foregoing example) for an offline interactive activity. Because of different skill levels of users participating in online interactive activities in the interactive application, different online interactive activities are provided for users with different skill levels. FIG. 4 shows "trial-preliminaries," "trial-semi-finals," "through matches," "challenge qualifications," etc. When the type of a user indicates that the skill level of the user is high, the match details of multiple matches including "challenge qualifications" are shown to the user of this type, and the user is prompted to participate in the "challenge qualifications." When the type of a user indicates that the skill level of the user is not high, the match details of multiple matches including "trial-preliminaries" may be shown to the user of this type, and after the user passes the "trial-preliminaries," "trial-quarter-finals" or "trial-semi-finals" are recommended to the user. Users may choose one of the matches in which they may participate to qualify to participate in offline interactive activities.

The skill level of a user may be obtained according to data of historical interactive activities in which the user participated in the interactive application, such as the winning rate of the user and how much money the user spends during Texas Hold'em poker games.

In an embodiment, after receiving a selection instruction sent by the user, the method further includes: deducting a preset number of virtual resources from an account of the interactive application associated with the user; and determining that the user qualifies to participate in the target online interactive activity after completing deduction of the preset number of virtual resources.

The process of selecting, by a user, a target online interactive activity may also be used as an enrollment activity for participating in an offline interactive activity. The user logs in the interactive application through an account, and the user needs to deduct corresponding virtual resources from the account when selecting the target online interactive event. As shown in FIG. 4, virtual resources required for enrolling in the "trial-semi-finals" are 10 million virtual resources, and a service fee is 1 million virtual resources. Virtual resources required for enrolling in the "trial-preliminaries" are 18,000 virtual resources, and a service fee is 5,000 virtual resources. Virtual resources required for enrolling in the "challenge qualifications" are 1 ticket without service charge. After the user selects a target online interactive activity, corresponding virtual resources are deducted from the account. If the virtual resources in the account are insufficient to support the user to participate in the target online interactive activity, the user cannot participate in the target online interactive activity. Otherwise, the user qualifies to participate in the target online interactive activity, and may participate in the target online interactive activity.

In an embodiment, taking the identity information as a certificate for allowing the user to participate in the offline interactive activity includes: generating a unique identity according to the identity information, the unique identity being used for verifying whether to match the identity information pre-stored by a server when participating in the offline interactive activity; and taking the unique identity as the certificate.

When using the identity information of the user to activate the qualification for participating in an offline interactive activity, the server generates a unique identity according to the identity information of the user. The identity information of the user includes identity card information of the user, account information of the interactive application, address and mailbox information, etc. The unique identity generated by the server according to these pieces of information may be a two-dimensional image such as a two-dimensional code. The user carries the two-dimensional image to participate in an offline interactive activity, and the two-dimensional image is scanned on the site of the offline interactive activity to recognize identity information in the two-dimensional image. When the recognized identity information is consistent with the identity information stored in the server, it is confirmed that matching verification is passed. That is, the user may participate in the offline interaction activity.

In an embodiment, after acquiring a target online interactive activity selected by a user in an interactive application, the method further includes: issuing prompt information within a predetermined time period before the target online interactive activity begins, the prompt information being used for prompting that the target online interactive activity is about to begin; or, receiving an activity viewing instruction sent by the user, and displaying online interactive activities, in which the user is allowed to participate, in the interactive application according to the activity viewing instruction, the online interactive activities in which the user is allowed to participate including the target online interactive activity.

After it is determined that the user qualifies to participate in the target online interactive activity, prompt information will be issued to the user before the target online interactive activity begins. For example, half an hour before the beginning of the "challenge qualifications," it is prompted that the target online interactive activity is about to begin, and it is reminded every 10 minutes from the half an hour before the beginning. In the 5 minutes before the beginning, it is reminded every 1 minute. The foregoing reminding manners include a voice reminder, a text reminder, a picture reminder, etc. The reminding way includes reminding through an interactive application and reminding via WeChat, SMS, e-mails, etc.

Online interactive activities in which users may participate may also be viewed in interactive applications. Users may view, through viewing instructions, online interactive activities in which they may participate, as well as the beginning time of online interactive activities.

For example, when the match beginning time is reached, the server may push a match beginning message to a client (i.e., interactive application). After receiving the message, the client asks the user to enter the match. A user may also acquire enrolled match information in the user's match list. One minute before the beginning of the match, the match may be entered. During the match, behaviors of the user such as raises and checks are reported to the server through a long connection. Game behaviors of other users at the same table are broadcast to the client by the server through the long connection. The client renders an interface according to a received command, and symmetric encryption is adopted for all communications between the client and the server. When the user wins the match, the server pushes the final result to the client, and the client shows match rewards.

Figure 5:
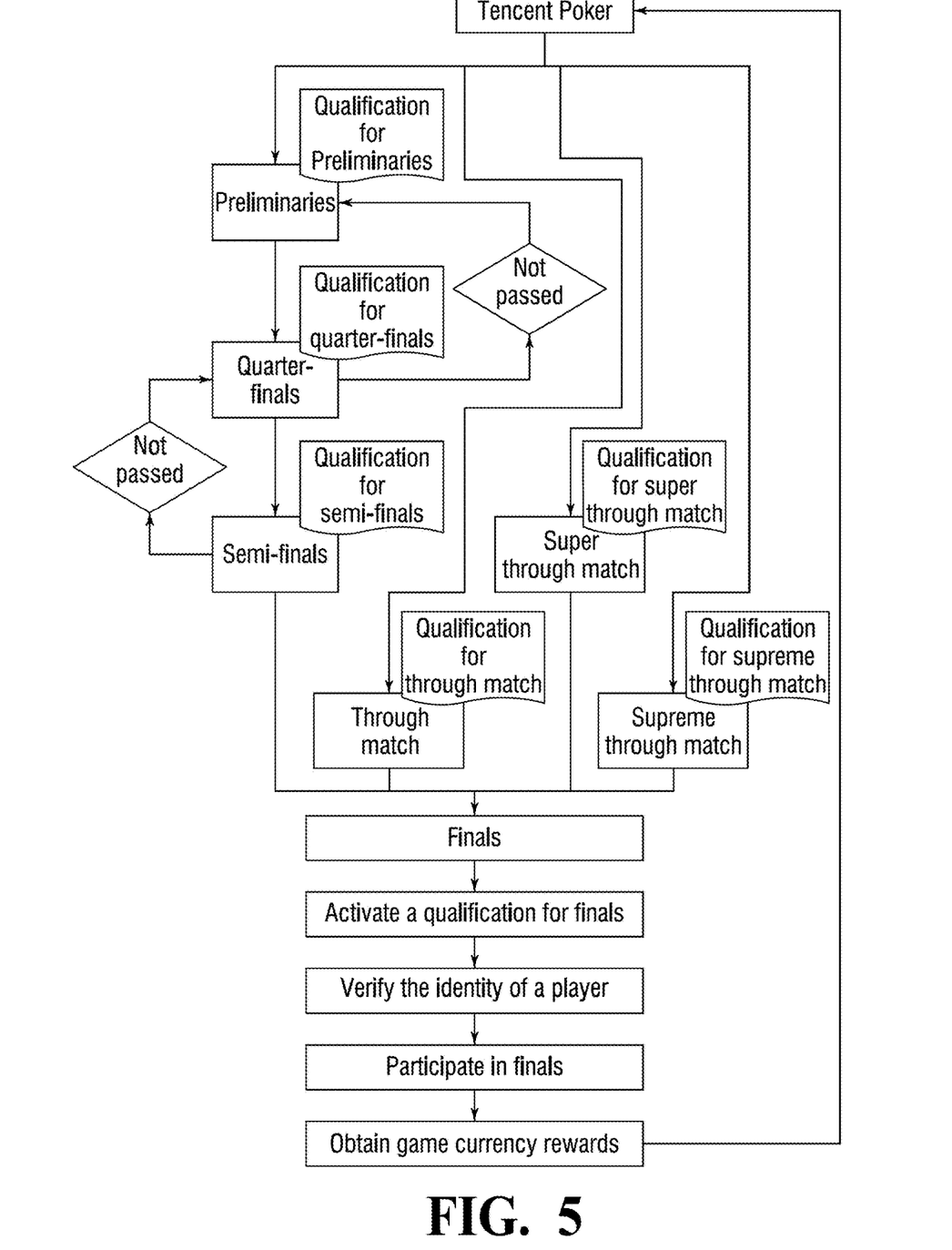
FIG. 5 is a flowchart of an optional interactive application processing method according to an embodiment of this application.

This embodiment is described with reference to FIG. 5.

The "Tencent Poker" APP is opened. A user may select any of four types of matches (i.e., online interactive activities) to qualify for the finals (offline interactive activities).

First type: The user qualifies, after successfully passing preliminaries, quarter-finals and semi-finals, for the finals. If the preliminaries are not passed, the user continues to participate in the preliminaries until the preliminaries are passed, and then participates in the quarter-finals. If the quarter-finals are not passed, the user continues to participate in the quarter-finals until the quarter-finals are passed, and then participates in the semi-finals. After the semi-finals are passed, the user qualifies for the finals.

Second type: Through matches. After the through matches are passed, the user qualifies for the finals.

Third type: Super through matches. After the super through matches are passed, the user qualifies for the finals.

Fourth type: Supreme through matches. After the supreme through matches are passed, the user qualifies for the finals.

In order to enroll in the foregoing four types of matches, the user needs to provide different virtual resources, and targeted user types are also different. For example, users with rich experience and high skills may participate in the supreme through matches. Users with less experience and low skills may participate in the super through matches.

After the user qualifies for the finals, the qualification for the finals is activated. The identity information of the user is acquired, and a unique identity is generated.

The identity of a player is verified. The server determines whether the unique identity of the user is consistent with the unique identity recorded in the server, and if so, verification is passed.

After identity verification is passed, the user may participate in the finals.

Virtual resource rewards such as game currency obtained in the finals may be returned to the interactive application, so that the user may use the game currency to perform an online interactive activity in the interactive application.

Figure 6:
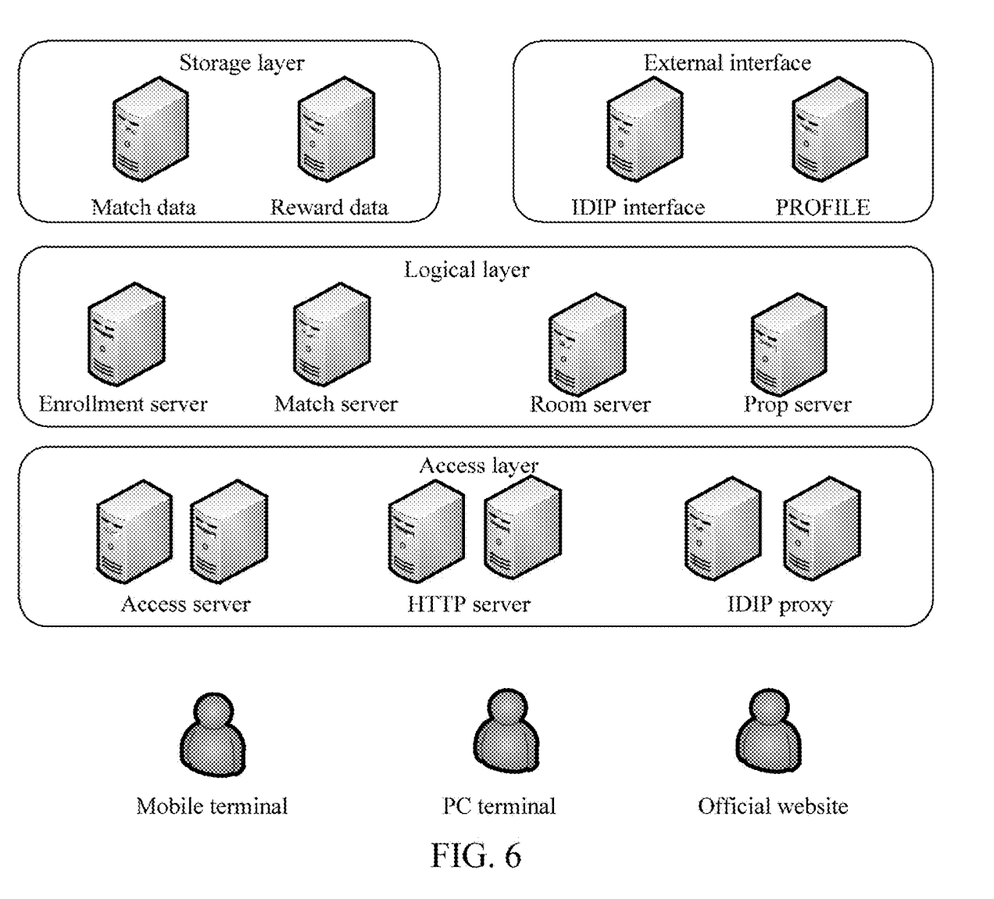
FIG. 6 is an architecture diagram of a server and a terminal according to an embodiment of this application.

The interactive application processing method in this embodiment may be implemented using the architecture of a server and a terminal as shown in FIG. 6. This will be separately described with reference to FIG. 6.

The access layer includes an access server, an HTTP server, and an IDIP proxy server.

The access server manages a long connection of a client (i.e., interactive application, unless otherwise specified, the following client refers to the interactive application), encrypts and decrypts a communication with the client, and is configured to ensure the safety of user data.

The HTTP server is responsible for responding to an HTTP request of the client and carrying the pull of match information.

The IDIP proxy server is configured to support operational activities and provide a general interface for various promotional activities.

The logical layer includes an enrollment server, a match server, a room server, and a prop server.

The enrollment server provides the pull of a list of matches, handles the enrollment request of the client, reviews qualifications and deducts fees.

The match server creates a match, and allocates rooms for the match.

The room server carries main logics of games, including information such as games, multiple tables, a single table, real-time rankings, and settlements.

The prop server handles in-game props of match rewards.

The storage layer includes storage of match data and reward data.

The storage layer provides storage of user information, match results, and user prop data.

The external interface includes PROFILE and an IDIP interface.

PROFILE is used for acquiring personal information of users of interactive applications.

The IDIP interface provides a general interface for operational activities, including WeChat, official website and other operational activities.

Figure 7:
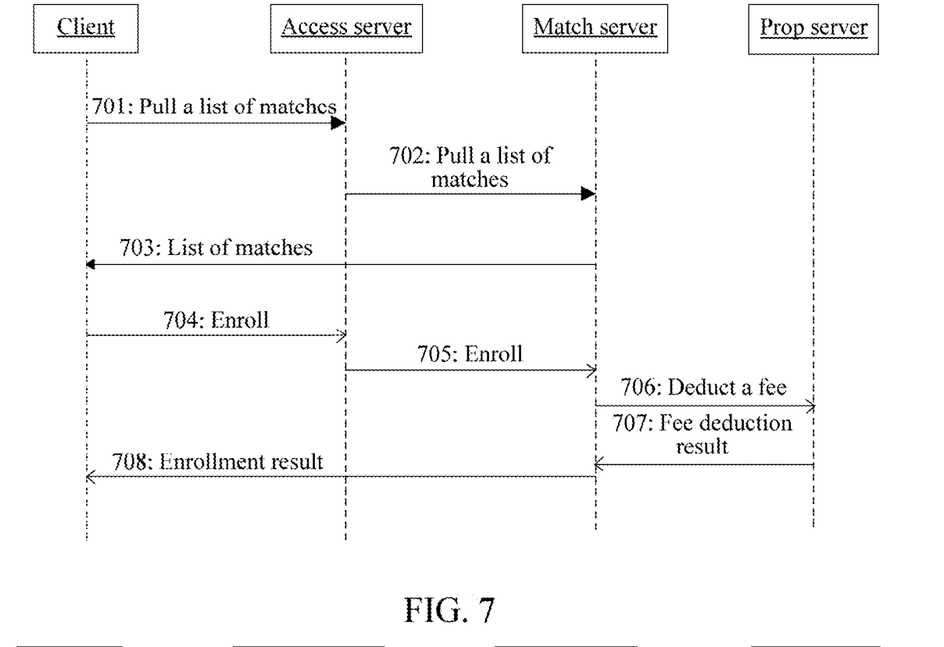
FIG. 7 is a flowchart of an enrollment process according to an embodiment of this application.

The enrollment process of this embodiment is shown in FIG. 7.

701: The client pulls a list of matches from the access server (FIG. 6).

702: The access server pulls the list of matches from the match server.

703: The match server returns the list of matches to the client.

704: The client enrolls through the access server.

705: The access server provides enrollment information for the match server.

706: The prop server deducts a fee according to the enrollment information of the match server.

707: The prop server returns a fee deduction result to the match server. Check the eligibility of an entrant, deduct a fee if the entrant meets the qualification, and otherwise, do not deduct a fee.

708: The match server returns an enrollment result to the client. If the fee deduction is successful, the enrollment is successful. Otherwise, the enrollment is unsuccessful.

Figure 8:
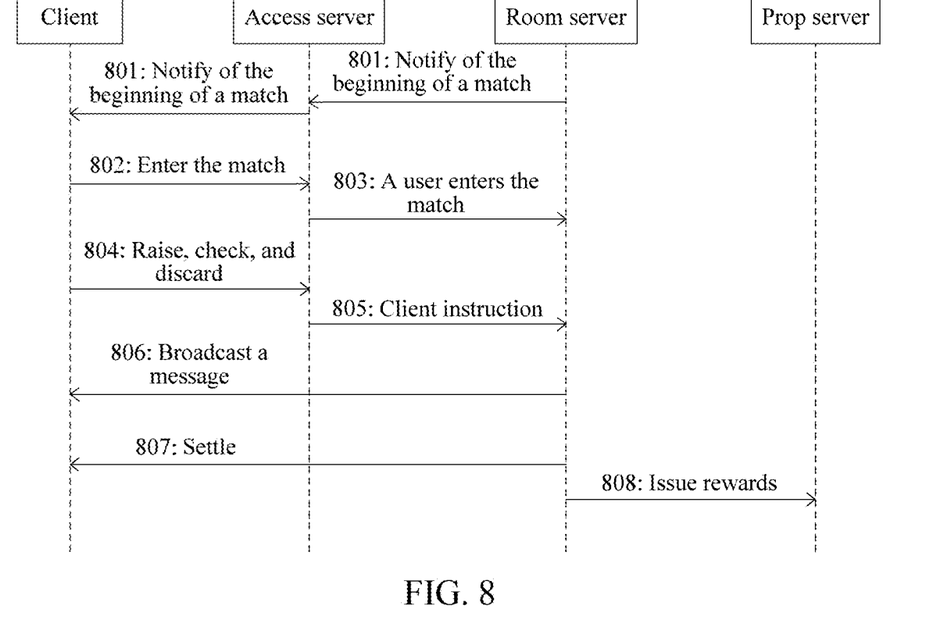
FIG. 8 is a flowchart of a match participating process according to an embodiment of this application.

The match participating process of this embodiment is shown in FIG. 8.

801: The room server sends a match beginning notification to the client through the access server.

802: The client accesses a match through the access server.

803: A user accesses the room server through the access server.

804: Behaviors of the user in a game process such as raises, checks and discards are uploaded to the access server.

805: The access server sends a behavior instruction of the client to the room server.

806: The room server broadcasts game behaviors of other users to the client. The user learns, through the broadcast, the behaviors of other users such as raises, checks and discards.

807: The room server settles game rewards.

808: The prop server records the issued game rewards.

Figure 9:
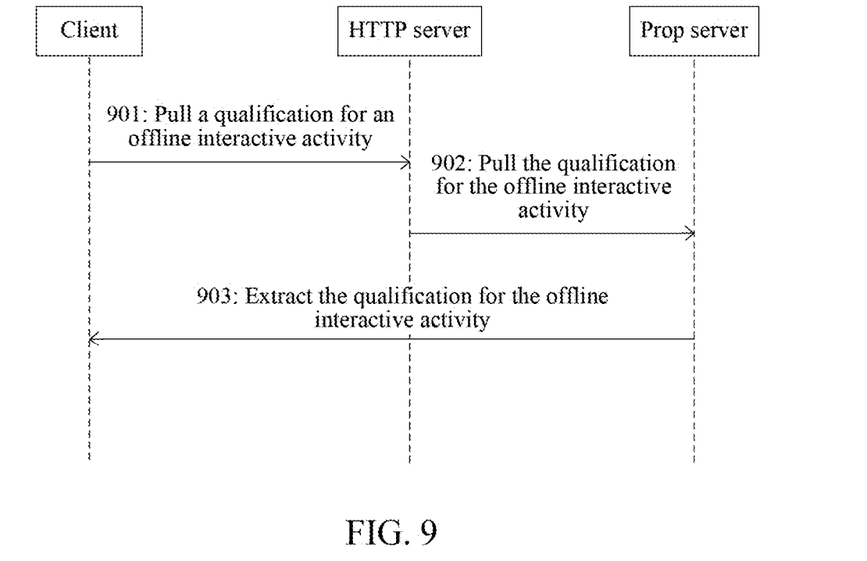
FIG. 9 is a flowchart of viewing eligibility according to an embodiment of this application.

The process of viewing eligibility in this embodiment is shown in FIG. 9.

901: The client pulls a qualification for participating in an offline interactive activity from the HTTP server.

902: The HTTP server pulls a qualification for an offline interactive activity from the prop server.

903: The prop server provides the qualification for the offline interactive activity to the client.

It is noted that, for the foregoing method embodiments, for the sake of simple description, they are all expressed as a series of action combinations, but those skilled in the art may know that this application is not limited by the described action sequence because certain steps may be performed in other orders or simultaneously according to this application. Second, those skilled in the art may also know that the embodiments described in the specification are all exemplary embodiments, and the involved actions and modules are not necessarily required by this application.

By means of the description of the foregoing implementation manner, those skilled in the art may understand that the method according to the foregoing embodiment may be implemented by means of software plus a necessary general hardware platform. Of course, the hardware may also be used, but in many cases, the former is a better implementation manner. Based on this understanding, the essence of the technical solution of this application or parts making contributions to the related technology may be embodied in the form of a software product, the computer software product being stored in a non-transitory storage medium (ROM/RAM, magnetic disks, optical disks, etc.), including a plurality of instructions used to enable a terminal device (mobile phones, computers, servers, or network devices, etc.) to perform the method according to each embodiment of this application.

Embodiment 2

According to the embodiment of this application, an interactive application processing apparatus for implementing the foregoing interactive application processing method is also provided. The interactive application processing apparatus is configured to execute the interactive application processing method provided according to the foregoing content of the embodiment of this application. The following specifically describes the interactive application processing apparatus provided according to the embodiment of this application.

Figure 10:
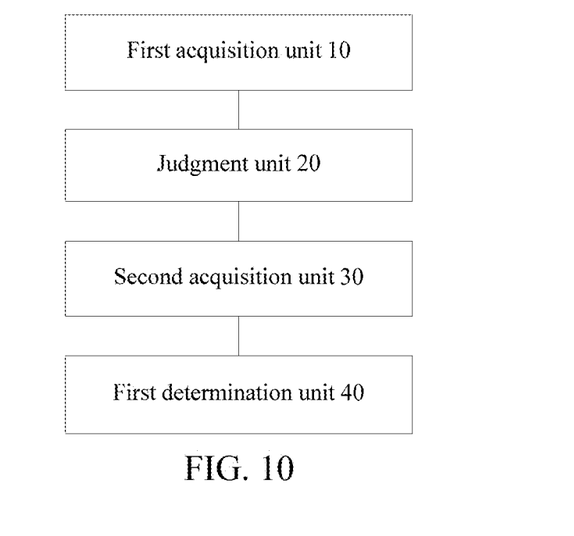
FIG. 10 is a schematic diagram of an interactive application processing apparatus according to an embodiment of this application.

FIG. 10 is a schematic diagram of an interactive application processing apparatus according to an embodiment of this application. As shown in FIG. 10, the interactive application processing apparatus mainly includes: a first acquisition unit 10, a judgment unit 20, a second acquisition unit 30, and a first determination unit 40.

The first acquisition unit 10 is configured to acquire a target online interactive activity selected by a user in an interactive application, the target online interactive activity having an association relationship with an offline interactive activity.

The judgment unit 20 is configured to judge, according to an activity result, whether the user qualifies to participate in the offline interactive activity, the activity result being derived from the user participating in the target online interactive activity.

The second acquisition unit 30 is configured to acquire, if it is determined that the user qualifies to participate in the offline interactive activity, identity information of the user.

The first determination unit 40 is configured to take the identity information as a certificate for allowing the user to participate in the offline interactive activity.

In this embodiment, an association relationship between an online interactive activity and an offline interactive activity is established, so a user qualifies to participate in the offline interactive activity by participating in the online interactive activity. If the user qualifies to participate in the offline interactive activity through an online interaction, identity information of the user is acquired to activate a qualification for participating in the offline interactive activity, so that the user participates in the offline interactive activity with the activated qualification. In this way, a relationship between an online interactive activity and an offline interactive activity is established, so that the online interactive activity and the offline interactive activity are no longer two independent activities, thereby solving the technical problem that an information interaction cannot be performed between related online and offline activities.

Meanwhile, by means of this embodiment, a user may qualify to participate in an offline interactive activity with the user's skills in an online interactive activity, thereby increasing the enthusiasm of the user participating in the online interactive activity. Compared with the way of purchasing a qualification for an offline interactive activity, the qualification obtained through an online interactive activity competition can better reflect the skill level of a user, reduce the occurrence of uneven skill levels caused by directly purchasing the qualification, and make the offline interactive activity more interesting.

In an embodiment, the apparatus further includes: a display unit, configured to display, in the interactive application, virtual resources obtained by the user participating in the offline interactive activity with the identity information after taking the identity information as a certificate for allowing the user to participate in the offline interactive activity, the user participating in the online interactive activity by using the virtual resources in the interactive application.

The user may use the obtained qualification to participate in the offline interactive activity. By participating in the offline interactive activity, physical rewards or virtual resource rewards may be obtained, the virtual rewards may be returned into the interactive application, and the user uses the virtual resource rewards in the interactive application to participate in the online interactive activity.

By means of this embodiment, a user performs an online interactive activity to qualify to participate in an offline interactive activity, and then uses virtual resource rewards obtained by participating in the offline interactive activity to perform the online interactive activity. The online interactive activity and the offline interactive activity form a closed loop, thereby making the online interactive activity and the offline interactive activity more interesting, and increasing the enthusiasm and user experience of the user participating in the online interactive activity and the offline interactive activity. In other words, selection of a user to participate in an offline interactive activity through an online interactive activity reflects the skill level of the user. For the interactive activities themselves, the interactive activities can be more interesting because all the users participating in offline interactive activities are skilled players.

For example, the interactive application is a "Tencent Poker" APP, the online interactive activity is Texas Hold'em poker, and the offline interactive activity is a Texas Hold'em poker tournament.

A user may open the "Tencent Poker" APP to view a match status (as shown in FIG. 3) to determine whether there is an upcoming match. FIG. 3 shows a multi-table tournament (including sit-and-go (SNG) and MTT) and a Texas Hold'em poker tournament. In this example, the upcoming match is the Texas Hold'em poker tournament. A user may choose to participate in "trials" in the "Tencent Poker" APP, which are trials for the selection of a qualification for participating in the Texas Hold'em poker tournament. After passing the "trials," the user qualifies to participate in the Texas Hold'em poker tournament. The user may use the obtained qualification to participate in the Texas Hold'em poker tournament, and may view virtual resources obtained by participating in the Texas Hold'em poker tournament in the "Tencent Poker" APP. Moreover, the user may use these virtual resources to play other games in the "Tencent Poker" APP.

In an embodiment, the first acquisition unit includes: a first determination module, configured to determine a type of the user according to historical operation data of the user in the interactive application; a showing module, configured to show an activity list to the user according to the type, online interactive activities in the activity list matching the type, so that the user may participate in the online interactive activities in the activity list; a receiving module, configured to receive a selection instruction sent by the user, the selection instruction being used for instructing to select a to-be-participated online interactive activity from the activity list; and a second determination module, configured to take the online interactive activity selected by the user as the target online interactive activity.

The target online interactive activity may be an online interactive activity (such as the trial in the foregoing example) for an offline interactive activity. Because of different competitive abilities of users participating in online interactive activities in the interactive application, different online interactive activities are provided for users with different competitive abilities. FIG. 4 shows "trial-preliminaries," "trial-semi-finals," "through matches," "challenge qualifications," etc. When the type of a user indicates that the skill level of the user is high, the match details of multiple matches including "challenge qualifications" are shown to the user of this type, and the user is prompted to participate in the "challenge qualifications." When the type of a user indicates that the skill level of the user is not high, the match details of multiple matches including "trial-preliminaries" may be shown to the user of this type, and after the user passes the "trial-preliminaries," "trial-quarter-finals" or "trial-semi-finals" are recommended to the user. Users may choose one of the matches in which they may participate to qualify to participate in offline interactive activities.

The skill level of a user may be obtained according to data of historical interactive activities in which the user participated in the interactive application, such as the winning rate of the user and how much money the user spends during Texas Hold'em poker games.

In an embodiment, the foregoing apparatus further includes: a deduction unit, configured to deduct a preset number of virtual resources from an account of the interactive application associated with the user after receiving a selection instruction sent by the user; and a second determination unit, configured to determine that the user qualifies to participate in the target online interactive activity after completing deduction of the preset number of virtual resources.

The process of selecting, by a user, a target online interactive activity may also be used as an enrollment activity for participating in an offline interactive activity. The user logs in the interactive application through an account, and the user needs to deduct corresponding virtual resources from the account when selecting the target online interactive event. As shown in FIG. 4, virtual resources required for enrolling in the "trial-semi-finals" are 10 million virtual resources, and a service fee is 1 million virtual resources. Virtual resources required for enrolling in the "trial-preliminaries" are 18,000 virtual resources, and a service fee is 5,000 virtual resources. Virtual resources required for enrolling in the "challenge qualifications" are 1 ticket without service charge. After the user selects a target online interactive activity, corresponding virtual resources are deducted from the account. If the virtual resources in the account are insufficient to support the user to participate in the target online interactive activity, the user cannot participate in the target online interactive activity. Otherwise, the user qualifies to participate in the target online interactive activity, and may participate in the target online interactive activity.

In an embodiment, the first determination unit includes: a generation module, configured to generate a unique identity according to the identity information, the unique identity being used for verifying whether to match the identity information pre-stored by a server when participating in the offline interactive activity; and an identification module, configured to take the unique identity as the certificate.

When using the identity information of the user to activate the qualification for participating in an offline interactive activity, the server generates a unique identity according to the identity information of the user. The identity information of the user includes identity card information of the user, account information of the interactive application, address and mailbox information, etc. The unique identity generated by the server according to these pieces of information may be a two-dimensional image such as a two-dimensional code. The user carries the two-dimensional image to participate in an offline interactive activity, and the two-dimensional image is scanned on the site of the offline interactive activity to recognize identity information in the two-dimensional image. When the recognized identity information is consistent with the identity information stored in the server, it is confirmed that matching verification is passed. That is, the user may participate in the offline interaction activity.

In an embodiment, the apparatus further includes: a prompt unit, configured to issue, after acquiring a target online interactive activity selected by a user in an interactive application, prompt information within a predetermined time period before the target online interactive activity begins, the prompt information being used for prompting that the target online interactive activity is about to begin; or, a viewing unit, configured to receive an activity viewing instruction sent by the user, and display online interactive activities, in which the user is allowed to participate, in the interactive application according to the activity viewing instruction, the online interactive activities in which the user is allowed to participate including the target online interactive activity.

After it is determined that the user qualifies to participate in the target online interactive activity, prompt information will be issued to the user before the target online interactive activity begins. For example, half an hour before the beginning of the "challenge qualifications," it is prompted that the target online interactive activity is about to begin, and it is reminded every 10 minutes from the half an hour before the beginning. In the 5 minutes before the beginning, it is reminded every 1 minute. The foregoing reminding manners include a voice reminder, a text reminder, a picture reminder, etc. The reminding way includes reminding through an interactive application and reminding via WeChat, SMS, e-mails, etc.

Online interactive activities in which users may participate may also be viewed in interactive applications. Users may view, through viewing instructions, online interactive activities in which they may participate, as well as the beginning time of online interactive activities.

For example, when the match beginning time is reached, the server may push a match beginning message to a client (i.e., interactive application). After receiving the message, the client asks the user to enter the match. A user may also acquire enrolled match information in the user's match list. One minute before the beginning of the match, the match may be entered. During the match, behaviors of the user such as raises and checks are reported to the server through a long connection. Game behaviors of other users at the same table are broadcast to the client by the server through the long connection. The client renders an interface according to a received command, and symmetric encryption is adopted for all communications between the client and the server. When the user wins the match, the server sends the final result to the client, and the client shows match rewards.

Embodiment 3

Figure 11:
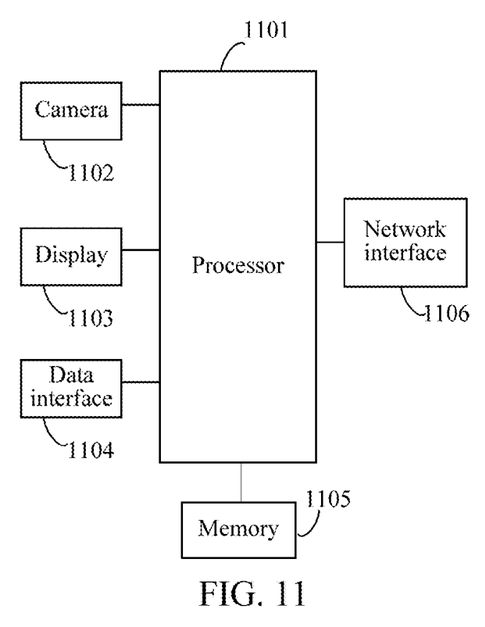
FIG. 11 is a schematic diagram of a terminal according to an embodiment of this application.

According to the embodiment of this application, a terminal for implementing the foregoing interactive application processing method is also provided. As shown in FIG. 11, the terminal includes a processor/processing circuitry 1101, a camera 1102, a display 1103, a data interface 1104, a memory 1105, and a network interface 1106.

The camera 1102 is configured to acquire the head portrait and identity information of a user, etc. For example, the camera is configured to take a photo of an identity card.

The data interface 1104 transmits the identity information collected by a third party tool to the processor 1101 through data transmission.

The memory 1105 is configured to store account information of the user and cache match information.

The network interface 1106 is configured to perform network communication with a server for data interaction with the server.

The display 1103 is configured to display online interactive activities.

The processor 1101 is configured to perform the following operation: acquiring a target online interactive activity selected by a user in an interactive application, the target online interactive activity having an association relationship with an offline interactive activity; judging, according to an activity result, whether the user qualifies to participate in the offline interactive activity, the activity result being derived from the user participating in the target online interactive activity; acquiring, if it is determined that the user qualifies to participate in the offline interactive activity, identity information of the user; and taking the identity information as a certificate for allowing the user to participate in the offline interactive activity.

The processor 1101 is also configured to display, in the interactive application, virtual resources obtained by the user participating in the offline interactive activity with the identity information after taking the identity information as a certificate for allowing the user to participate in the offline interactive activity, the user participating in the online interactive activity by using the virtual resources in the interactive application.

The processor 1101 is also configured to acquire a target online interactive activity selected by a user in an interactive application in the following manner: determining a type of the user according to historical operation data of the user in the interactive application; showing an activity list to the user according to the type, online interactive activities in the activity list matching the type, so that the user may participate in the online interactive activities in the activity list; receiving a selection instruction sent by the user, the selection instruction being used for instructing to select a to-be-participated online interactive activity from the activity list; and taking the online interactive activity selected by the user as the target online interactive activity.

The processor 1101 is also configured to deduct, after receiving a selection instruction sent by the user, a preset number of virtual resources from an account of the interactive application associated with the user; and determine that the user qualities to participate in the target online interactive activity after completing deduction of the preset number of virtual resources.

The processor 1101 is also configured to issue, after acquiring a target online interactive activity selected by a user in an interactive application, prompt information within a predetermined time period before the target online interactive activity begins, the prompt information being used for prompting that the target online interactive activity is about to begin; or, receive an activity viewing instruction sent by the user, and display online interactive activities, in which the user is allowed to participate, in the interactive application according to the activity viewing instruction, the online interactive activities in which the user is allowed to participate including the target online interactive activity.

The processor 1101 is also configured to take the identity information as a certificate for allowing the user to participate in the offline interactive activity in the following manner: generating a unique identity according to the identity information, the unique identity being used for verifying whether to match the identity information pre-stored by a server when participating in the offline interactive activity; and taking the unique identity as the certificate.

In an embodiment, for a specific example in this embodiment, reference may be made to the examples described in embodiment 1 and embodiment 2, which will not be described herein again in this embodiment.

Embodiment 4

The embodiment of this application also provides a non-transitory computer-readable storage medium. In this embodiment, the foregoing storage medium may be configured to store a program code of the interactive application processing method according to the embodiment of this application.

In this embodiment, the foregoing storage medium may be at least one network device among multiple network devices in a mobile communication network, a wide area network, a metropolitan area network, or a local area network.

In this embodiment, the storage medium is configured to store a program code for performing the following steps: acquiring a target online interactive activity selected by a user in an interactive application, the target online interactive activity having an association relationship with an offline interactive activity; judging, according to an activity result, whether the user qualifies to participate in the offline interactive activity, the activity result being derived from the user participating in the target online interactive activity; acquiring, if it is determined that the user qualifies to participate in the offline interactive activity, identity information of the user; and taking the identity information as a certificate for allowing the user to participate in the offline interactive activity.

In this embodiment, the foregoing storage medium may include, but is not limited to, various media capable of storing a program code, such as a USB flash disk, a read-only memory (ROM), a random access memory (RAM), a mobile hard disk, a magnetic disk or an optical disk.

In this embodiment, according to the program code already stored in the storage medium, the processor performs: displaying, in the interactive application, virtual resources obtained by the user participating in the offline interactive activity with the identity information after taking the identity information as a certificate for allowing the user to participate in the offline interactive activity, the user participating in the online interactive activity by using the virtual resources in the interactive application.

In this embodiment, according to the program code already stored in the storage medium, the processor performs: determining a type of the user according to historical operation data of the user in the interactive application; showing an activity list to the user according to the type, online interactive activities in the activity list matching the type, so that the user may participate in the online interactive activities in the activity list; receiving a selection instruction sent by the user, the selection instruction being used for instructing to select a to-be-participated online interactive activity from the activity list; and taking the online interactive activity selected by the user as the target online interactive activity.

In this embodiment, according to the program code already stored in the storage medium, the processor performs: deducting a preset number of virtual resources from an account of the interactive application associated with the user; and determining that the user qualifies to participate in the target online interactive activity after completing deduction of the preset number of virtual resources.

In this embodiment, according to the program code already stored in the storage medium, the processor performs: issuing prompt information within a predetermined time period before the target online interactive activity begins, the prompt information being used for prompting that the target online interactive activity is about to begin; or, receiving an activity viewing instruction sent by the user, and displaying online interactive activities, in which the user is allowed to participate, in the interactive application according to the activity viewing instruction, the online interactive activities in which the user is allowed to participate including the target online interactive activity.

In this embodiment, according to the program code already stored in the storage medium, the processor performs: generating a unique identity according to the identity information, the unique identity being used for verifying whether to match the identity information pre-stored by a server when participating in the offline interactive activity; and taking the unique identity as the certificate.

In an embodiment, for a specific example in this embodiment, reference may be made to the examples described in Embodiment 1 and Embodiment 2, which will not be described herein again in this embodiment.

The sequence numbers of the foregoing embodiments of this application are merely for the convenience of description, and do not imply the preference among the embodiments.

If the integrated unit in the foregoing embodiments is implemented in the form of a software functional unit and sold or used as an independent product, it may also be stored in the foregoing non-transitory computer-readable storage medium. Based on this understanding, the essence of the technical solution of this application or parts making contributions to the related technology or all or part of the technical solution may be embodied in the form of a software product, the computer software product being stored in a storage medium, including a plurality of instructions used to enable one or more computer devices (personal computer, server, or network device) to perform all or part of the steps of the method according to each embodiment of this application.

In the foregoing embodiments of this application, the description of each embodiment is emphasized. For the part that was not described in detail in an embodiment, reference may be made to the relevant description of other embodiments.

In several embodiments provided in this application, it will be appreciated that the disclosed client may be implemented in other manners. Here, the apparatus embodiments described above are only illustrative. For example, the division of the units is only a division of a logical function, and there may be another division manner in actual implementation. For example, multiple units or components may be combined or may be integrated into another system, or some features may be ignored or not performed. In addition, the displayed or discussed mutual coupling or direct coupling or communication connection may be indirect coupling or communication connection through some interfaces, units or modules, and may be electrical or in other forms.

The units described as separate parts may or may not be physically separated, and the parts displayed as units may or may not be physical units, that is, may be located in one place, or may be distributed on multiple network units. Some or all of the units may be selected according to actual requirements to achieve the purpose of the solution of this embodiment.

In addition, the functional units in the embodiments of this application may be integrated into one processing unit, or each of the units may exist alone physically, or two or more units may be integrated into one unit. The integrated unit may be implemented in the form of hardware, or may be implemented in the form of a software functional unit.

The foregoing description is only an exemplary implementation manner of this application. It is pointed out that for a person of ordinary skill in the art, several improvements and modifications may be made without departing from the principle of this application. These improvements and modifications are regarded as the protection scope of this application.

INDUSTRIAL APPLICABILITY

In the embodiments of this application, a user qualifies to participate in an offline interactive activity by participating in an online interactive activity. If the user qualifies to participate in the offline interactive activity through an online interaction, identity information of the user is acquired to activate a qualification for participating in the offline interactive activity, so that the user participates in the offline interactive activity with the activated qualification. In this way, a relationship between an online interactive activity and an offline interactive activity is established, so that the online interactive activity and the offline interactive activity are no longer two independent activities, thereby solving the technical problem that an information interaction cannot be performed between related online and offline activities.

What is claimed is:

1. An interactive application processing method, comprising:
   receiving a selection of an online interactive activity by a user in an interactive application, the online interactive activity being associated with an offline interactive activity that is performed without the interactive application;
   determining, by circuitry of an interactive application apparatus, according to a performance result in the online interactive activity, whether the user qualifies to participate in the offline interactive activity;
   acquiring, when the user is determined to qualify to participate in the offline interactive activity, identity information of the user;
   generating an electronic certificate based on the identity information for allowing the user to participate in the offline interactive activity; and
   applying virtual resources obtained by participation in the offline interactive activity with the electronic certificate to virtual resources available to the user in the interactive application.

2. The method according to claim 1, wherein the method further comprises:
   receiving the virtual resources obtained by the user participating in the offline interactive activity from a server; and
   displaying, in the interactive application, the virtual resources available to the user in the interactive application, and the user using the virtual resources obtained in the offline interactive activity to participate in the online interactive activity.

3. The method according to claim 1, wherein the receiving comprises:
   determining a skill level of the user according to historical data of the user in the interactive application;
   presenting an activity list to the user according to the skill level, the activity list including a plurality of online interactive activities that match the skill level of the user, and the plurality of online interactive activities including the online interactive activity; and
   receiving a selection instruction from the user, the selection instruction indicating the selection of the online interactive activity from the activity list.

4. The method according to claim 3, wherein the method further comprises:
   deducting a preset number of the virtual resources available to the user in the interactive application from an account of the interactive application associated with the user, the virtual resources available to the user in the interactive application including the virtual resources obtained by the user participating in the offline interactive activity; and
   determining that the user qualifies to participate in the online interactive activity after completing the deduction of the preset number of the virtual resources.

5. The method according to claim 1, wherein the method further comprises:
   displaying a reminder within a predetermined time period before the online interactive activity begins, the reminder indicating a starting time of the online interactive activity.

6. The method according to claim 1, further comprising:
   generating a unique identity according to the identity information, the unique identity including a two-dimensional barcode; and
   determining whether the user is allowed to connect to the offline interactive activity based on the two-dimensional barcode.

7. The method according to claim 1, further comprising:
   receiving an activity viewing instruction from the user; and
   displaying a plurality of online interactive activities and a starting time of each of the plurality of online interactive activities in the interactive application according to the activity viewing instruction, the plurality of online interactive activities including the online interactive activity.

8. An interactive application processing apparatus, comprising:
   circuitry configured to
      receive a selection of an online interactive activity by a user in an interactive application, the online interactive activity being associated with an offline interactive activity that is performed without the interactive application;
      determine according to a performance result in the online interactive activity, whether the user qualifies to participate in the offline interactive activity;
      acquire, when the user is determined to qualify to participate in the offline interactive activity, identity information of the user;
      generate an electronic certificate based on the identity information for allowing the user to participate in the offline interactive activity; and
      apply virtual resources obtained by participation in the offline interactive activity with the electronic certificate to virtual resources available to the user in the interactive application.

9. The apparatus according to claim 8, wherein the circuitry is further configured to
   receive the virtual resources obtained by the user participating in the offline interactive activity from a server; and
   display, in the interactive application, the virtual resources available to the user in the interactive application, and the user using the virtual resources obtained in the offline interactive activity to participate in the online interactive activity.

10. The apparatus according to claim 8, wherein the circuitry is further configured to
determine a skill level of the user according to historical data of the user in the interactive application;
present an activity list to the user according to the skill level, the activity list including a plurality of online interactive activities that match the skill level of the user, and the plurality of online interactive activities including the online interactive activity; and
receive a selection instruction from the user, the selection instruction indicating the selection of the online interactive activity from the activity list.

11. The apparatus according to claim 10, wherein the circuitry is further configured to deduct a preset number of the virtual resources available to the user in the interactive application from an account of the interactive application associated with the user, the virtual resources available to the user in the interactive application including the virtual resources obtained by the user participating in the offline interactive activity; and
determine that the user qualifies to participate in the online interactive activity after completing the deduction of the preset number of the virtual resources.

12. The apparatus according to claim 8, wherein the circuitry is further configured to display a reminder within a predetermined time period before the online interactive activity begins, the reminder indicating a starting time of the online interactive activity.

13. The apparatus according to claim 8, wherein the circuitry is further configured to
generate a unique identity according to the identity information, the unique identity including a two-dimensional barcode; and
determine whether the user is allowed to connect to the offline interactive activity based on the two-dimensional barcode.

14. The apparatus according to claim 8, wherein the circuitry is further configured to
receive an activity viewing instruction from the user; and
display a plurality of online interactive activities and a starting time of each of the plurality of online interactive activities in the interactive application according to the activity viewing instruction, the plurality of online interactive activities including the online interactive activity.

15. A non-transitory computer-readable medium storing a program executable by a processor to perform:
receiving a selection of an online interactive activity by a user in an interactive application, the online interactive activity being associated with an offline interactive activity that is performed without the interactive application;
determining according to a performance result in the online interactive activity, whether the user qualifies to participate in the offline interactive activity;
acquiring, when the user is determined to qualify to participate in the offline interactive activity, identity information of the user;
generating an electronic certificate based on the identity information for allowing the user to participate in the offline interactive activity; and
applying virtual resources obtained by participation in the offline interactive activity with the electronic certificate to virtual resources available to the user in the interactive application.

16. The non-transitory computer-readable medium according to claim 15, further comprising:
receiving the virtual resources obtained by the user participating in the offline interactive activity from a server; and
displaying, in the interactive application, the virtual resources available to the user in the interactive application, and the user using the virtual resources obtained in the offline interactive activity to participate in the online interactive activity.

17. The non-transitory computer-readable medium according to claim 15, wherein the receiving comprises:
determining a skill level of the user according to historical data of the user in the interactive application;
presenting an activity list to the user according to the skill level, the activity list including a plurality of online interactive activities that match the skill level of the user, and the plurality of online interactive activities including the online interactive activity; and
receiving a selection instruction from the user, the selection instruction indicating the selection of the online interactive activity from the activity list.

18. The non-transitory computer-readable medium according to claim 17, further comprising:
deducting a preset number of the virtual resources available to the user in the interactive application from an account of the interactive application associated with the user, the virtual resources available to the user in the interactive application including the virtual resources obtained by the user participating in the offline interactive activity; and
determining that the user qualifies to participate in the online interactive activity after completing the deduction of the preset number of the virtual resources.

19. The non-transitory computer-readable medium according to claim 15, further comprising:
displaying a reminder within a predetermined time period before the online interactive activity begins, the reminder indicating a starting time of the online interactive activity.

20. The non-transitory computer-readable medium according to claim 15, further comprising:
generating a unique identity according to the identity information, the unique identity including a two-dimensional barcode; and
determining whether the user is allowed to connect to the offline interactive activity based on the two-dimensional barcode.

* * * * *